United States Patent
Laurent et al.

(10) Patent No.: US 10,645,298 B2
(45) Date of Patent: May 5, 2020

(54) METHODS, DEVICES AND SYSTEMS FOR AUTOMATIC ZOOM WHEN PLAYING AN AUGMENTED SCENE

(71) Applicant: INTERDIGITAL CE PATENT HOLDINGS, Paris (FR)

(72) Inventors: Anthony Laurent, Vignoc (FR); Pierrick Jouet, Rennes (FR); Caroline Baillard, saint sulpice la foret (FR)

(73) Assignee: INTERDIGITAL CE PATENT HOLDINGS, SAS, Paris (FR)

( * ) Notice: Subject to any disclaimer, the term of this patent is extended or adjusted under 35 U.S.C. 154(b) by 0 days.

(21) Appl. No.: 15/687,524

(22) Filed: Aug. 27, 2017

(65) Prior Publication Data
US 2018/0070019 A1 Mar. 8, 2018

(30) Foreign Application Priority Data
Sep. 6, 2016 (EP) .................................. 16306115

(51) Int. Cl.
| | |
|---|---|
| *G06T 15/20* | (2011.01) |
| *H04N 5/232* | (2006.01) |
| *G06T 7/73* | (2017.01) |
| *G06T 7/13* | (2017.01) |
| *G06T 19/00* | (2011.01) |

(52) U.S. Cl.
CPC .......... *H04N 5/23296* (2013.01); *G06T 7/13* (2017.01); *G06T 7/73* (2017.01); *G06T 15/205* (2013.01);
(Continued)

(58) Field of Classification Search
CPC .......... H04N 5/23296; H04N 5/23299; H04N 5/23206; H04N 5/23293; H04N 5/23222;
(Continued)

(56) References Cited

U.S. PATENT DOCUMENTS 8,817,161 B2 * 8/2014 Hosoe ................ G06K 9/00255
348/333.02
8,896,629 B2 * 11/2014 Meier ..................... G06F 3/011
345/632
(Continued)

FOREIGN PATENT DOCUMENTS

WO WO2014023463 2/2014

OTHER PUBLICATIONS

Anonymous, "Vuforia Object Scanner", http://library.vuforia.com/articles/Training/Vuforia-Object-Scanner-Users-Guide, 2011, pp. 1-9.
(Continued)

*Primary Examiner* — Robert J Craddock
(74) *Attorney, Agent, or Firm* — Invention Mine LLC

(57) ABSTRACT

The present disclosure relates to methods, apparatus and systems for automatically adapt the zoom coefficient of the camera of a system when running an augmented reality application. A pose estimation is performed for the camera which captures the real scene and the boundaries of the AR scene are calculated. According to the camera frustum and the boundaries, three-dimension rectangles are computes to determine a zoom coefficient that would optimize the seeing of the seen and the optimal position for the camera. The zoom is automatically optically or digitally adapted and the optimal position is indicated to the user by visual, audio or haptic means.

13 Claims, 5 Drawing Sheets

(52) U.S. Cl.
CPC ....... *G06T 19/006* (2013.01); *H04N 5/23206* (2013.01); *H04N 5/23293* (2013.01); *H04N 5/23299* (2018.08); *G06T 2207/30244* (2013.01)

(58) Field of Classification Search
CPC ........... H04N 5/23203; H04N 5/23212; H04N 21/2187; H04N 21/4126; H04N 21/431; H04N 21/658; H04N 13/236; H04N 13/221; G06T 7/73; G06T 7/13; G06T 15/205; G06T 19/006; G06T 2207/30244
See application file for complete search history.

(56) References Cited

U.S. PATENT DOCUMENTS

| | | |
|---|---|---|
| 2012/0098992 A1 | 4/2012 | Hosoe |
| 2012/0176410 A1 | 7/2012 | Meier et al. |
| 2015/0254855 A1 | 9/2015 | Patankar et al. |

OTHER PUBLICATIONS

Alessandro et al., "Zooming interfaces for Augmented Reality Browsers", 12th International Conference on Human-Computer Interaction with Mobile Devices and Services, MobileHCI 2010, Lisbon, Portugal, Sep. 7, 2010, pp. 1-10.

Avery et al., "Improving Spatial Perception for Augmented Reality X-Ray Vision", IEEE Virtual Reality 2009, Lafayette, Louisiana, USA, Mar. 14, 2010, pp. 79-82.

Zollmann et al., "Augmented Reality for Construction Site Monitoring and Documentation", Proceedings of the IEEE, vol. 102, No. 2, Feb. 2014, pp. 137-154.

\* cited by examiner

METHODS, DEVICES AND SYSTEMS FOR AUTOMATIC ZOOM WHEN PLAYING AN AUGMENTED SCENE

1. REFERENCE TO RELATED EUROPEAN APPLICATION

This application claims priority from European Patent Application No. 16306115.3, entitled "METHODS, DEVICES AND SYSTEMS FOR AUTOMATIC ZOOM WHEN PLAYING AN AUGMENTED REALITY SCENE," filed on Sep. 6, 2016, the contents of which are hereby incorporated by reference in its entirety.

2. TECHNICAL FIELD

The present disclosure relates generally to the field of Augmented Reality, and more particularly to augmented reality application running on a video pass-through device.

3. BACKGROUND

An Augmented Reality (AR) application overlays three-dimensional artificial objects (e.g. computer-generated imagery, also called CGI) atop the real world. Realism and real-time performance are key criteria to assess AR applications. There are two types of AR devices: "optical see-through devices", like smart-glasses for example and "video pass-through" devices, like smartphones or tablets for instance. The present disclosure relates to this second type of AR devices.

Video pass-through devices are apparatus equipped with a display screen, a camera and means for the user to control the pose (location and aiming direction) of the camera in real time. For example, smartphones and tablets are AR devices when running an AR application, using their front screen and their rear-facing camera. In this case, the user controls the camera pose by handling the device. The video captured by the camera is rendered on-the-fly on the screen. The AR application overlay virtual objects of an AR scene on the images of the video.

In certain optimal camera angles, the user may watch an entire AR scene. However, if the camera is too close from the location of the AR scene or if the aiming direction of the camera is not in the optimal direction, some of the AR objects are out of the scope of the camera. If the camera is too far from the location of the AR scene, AR objects are small and details may be not seeable on the screen. To resolve this problem, the user has to search for the optimal pose by himself. Such a solution is not satisfying because the user is not always aware that he is missing objects or details and because the search of the optimal pose is a tedious task which disturbs the pleasant use of the AR application.

4. SUMMARY

The present disclosure relates to a method of automatically adapt the zoom and the aiming direction of the camera of a video pass-through device when running an Augmented Reality application. According to the pose estimation of the camera of the video pass-through device and the calculation of boundaries of the AR scene, the optical or digital zoom of the camera is adapted in order to optimize the seeing of the AR without moving of the user. An optimal position may be indicated to the user to incite him to move.

The present disclosure relates to a method of rendering images on a display device when playing an augmented reality scene from the point of view of a camera, the method comprising:
  determining boundaries of the augmented reality scene;
  determining a zoom coefficient according to an estimation of a pose of the camera and the boundaries of the scene; and
  rendering images on the display device from the camera according to the zoom coefficient.

According to a particular characteristic, the method further comprises indicating a position of the camera to the user using effects selected from group comprising visual, audio or haptics effects.

According to a specific embodiment, the position is determined according to a direction and a weight associated with at least one element of the augmented reality scene.

According to a specific embodiment, the augmented reality scene comprises non-rendered elements corresponding to objects of a real scene captured by the camera, said elements being taken into account when calculating said boundaries of the augmented reality scene.

According to a particular characteristic, the camera is motorized and the method further comprises controlling the aiming direction of the camera according to the boundaries of the augmented reality scene and the computed zoom coefficient.

According to a specific embodiment, the camera comprises an optical zoom function and the method further comprises controlling the optical zoom function according to the computed zoom coefficient. In another embodiment, a digital zoom is operated on the images according to the zoom coefficient.

The present disclosure also relates to a device having a display configured to render images when playing an augmented reality scene from the point of view of a camera, the device comprising a memory associated with at least one processor configured to:
  determine boundaries of the augmented reality scene;
  determine a zoom coefficient according to an estimation of a pose of the camera and the boundaries of the scene;
  Render images from the forward-facing camera according to the zoom coefficient.

The present disclosure also relates to a device having a display configured to render images from a camera when playing an augmented reality scene, the device comprising:
  means for determining boundaries of the augmented reality scene;
  means for determining a zoom coefficient according to an estimation of a pose of the camera and the boundaries of the scene;
  means for rendering images from the forward-facing camera according to the zoom coefficient.

The present disclosure also relates to a computer program product downloadable from a communication network and/or recorded on a medium readable by computer and/or executable by a processor, comprising program code instructions for implementing the steps of the above method for rendering images from a camera on a display device when playing an augmented reality scene when it is executed by a processor.

5. LIST OF FIGURES

The present disclosure will be better understood, and other specific features and advantages will emerge upon reading the following description, the description making reference to the annexed drawings wherein.

Figure 7:
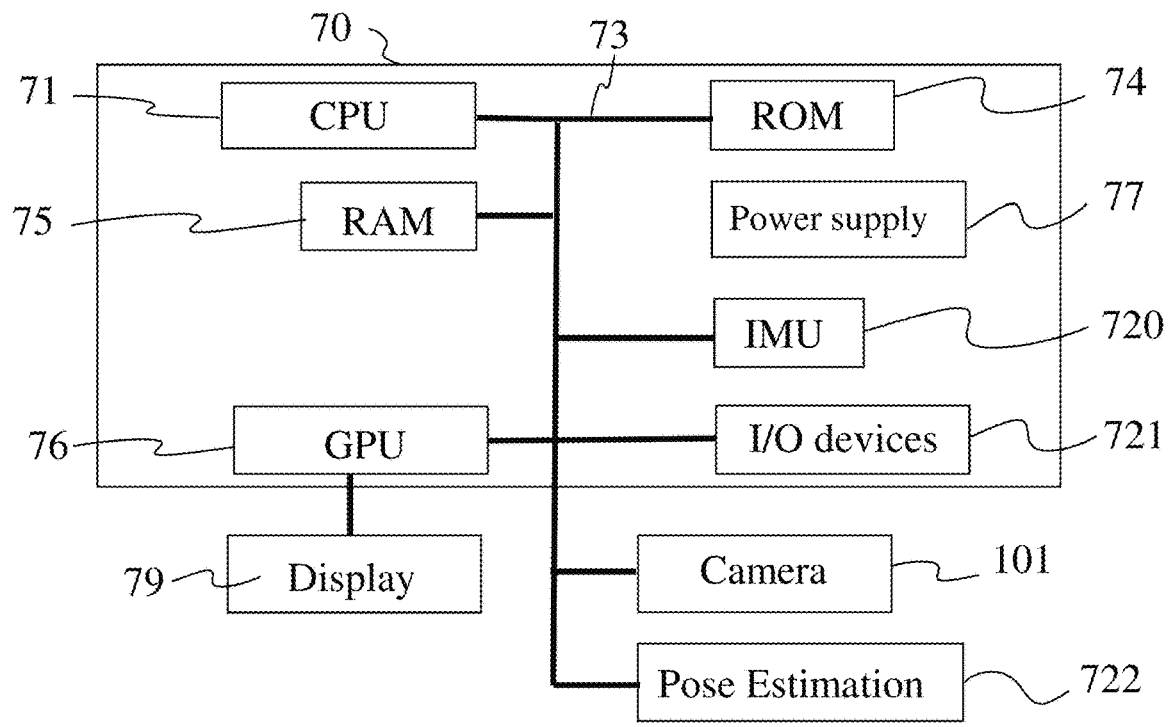
FIG. 7 shows a hardware embodiment of an apparatus configured to render images from the camera of FIGS. 1, 2 and 3 when playing an augmented reality scene, according to a specific embodiment of the present principles.
Figure 8:
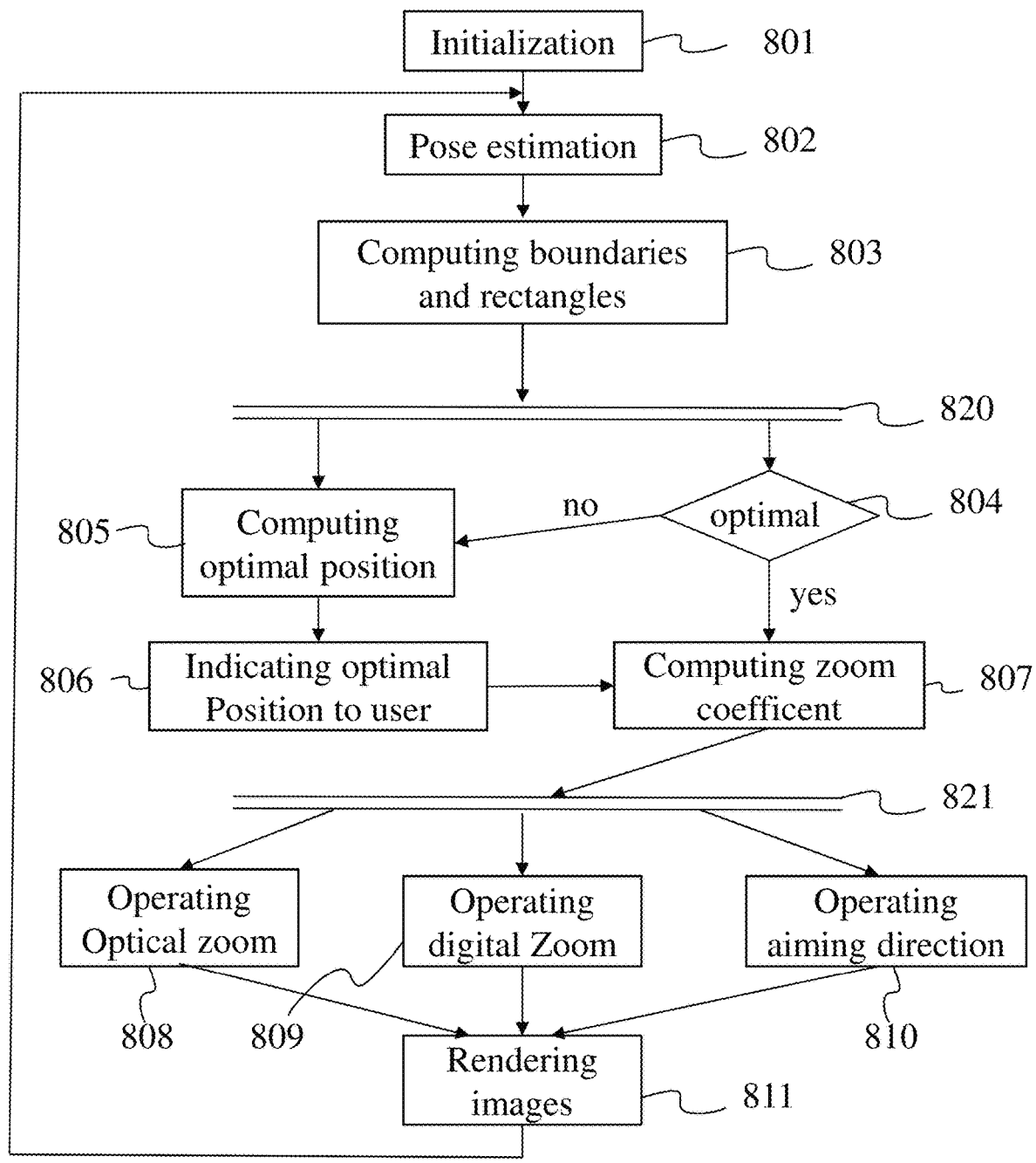

FIG. 8 diagrammatically shows an embodiment of a method as implemented in a processing device such as the device of FIG. 7 according to a non-restrictive advantageous embodiment.

6. DETAILED DESCRIPTION OF EMBODIMENTS

The subject matter is now described with reference to the drawings, wherein like reference numerals are used to refer to like elements throughout. In the following description, for purposes of explanation, numerous specific details are set forth in order to provide a thorough understanding of the subject matter. It is understood that subject matter embodiments can be practiced without these specific details.

According to a non-limitative embodiment of the present disclosure, a method and a device to automatically adapt the zoom and the aiming direction of the camera of a video pass-through device when running an Augmented Reality application are disclosed.

Searching for the optimal pose of the camera of a video pass-through device running an AR application consists in modifying the pose of the camera. The pose is the combination of the location in the three-dimensional space and the aiming direction of the camera. Automatically controlling the location of the camera requires motorized mechanisms to displace the camera. Video pass-through devices are usually not equipped with such mechanisms.

Figure 1:
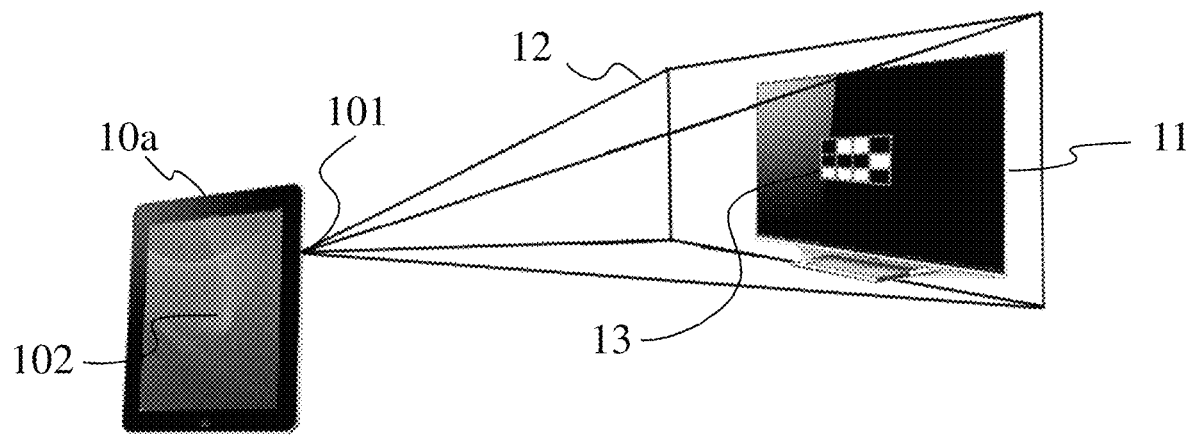
FIG. 1 illustrates an example of a tablet used as a video pass-through device, according to a specific embodiment of the present principles.

FIG. 1 illustrates an example of a tablet 10a used as a video pass-through device. The device 10a constitutes a rig comprising a screen 102 and a camera 101. The camera 101 is filming a scene of the world comprising real objects 11, e.g. a TV set on FIG. 1a. The scene is the part of the world included in the frustum 12 of the camera 101. The captured scene is displayed in real time on the screen 102 of tablet 10a. This functionality makes the tablet 10a a video pass-through device. By handling the tablet 10a, a user controls the pose of the camera 101. Indeed, the location and the aiming direction of the camera 101 are directly related to the location and the orientation of the device 10a. In a particular embodiment, the camera 101 of the tablet 10a is motorized and the AR application may partially control the aiming direction of the camera 101. An AR application requires means to determine the pose of the camera. On FIG. 1, a fiducial marker 13 is displayed on the screen of the real object 11 as an example of pose estimation means. In this example, the AR application processes the images captured by the camera 101, recognizes the fiducial marker 13 and according to the shape and the size of the marker, estimates the pose (i.e. location in a frame of reference related to the marker and aiming direction) of the camera 101 (and as a consequence of the device 10a). In a variant, the AR application estimates the pose of the camera according to the recognition of objects, for example specific furnitures known to be at a particular location, in the images. In another embodiment, the pose estimation means is a system of infra-red cameras located in the room and tracking infra-red markers dotted on the back of the tablet 10a. In another embodiment, the application uses information from the inertial measurement unit (e.g. accelerometers and gyroscopes) of the table to estimate the pose of the device 10a. The present disclosure is not limited to these examples of pose estimation systems.

Figure 2:
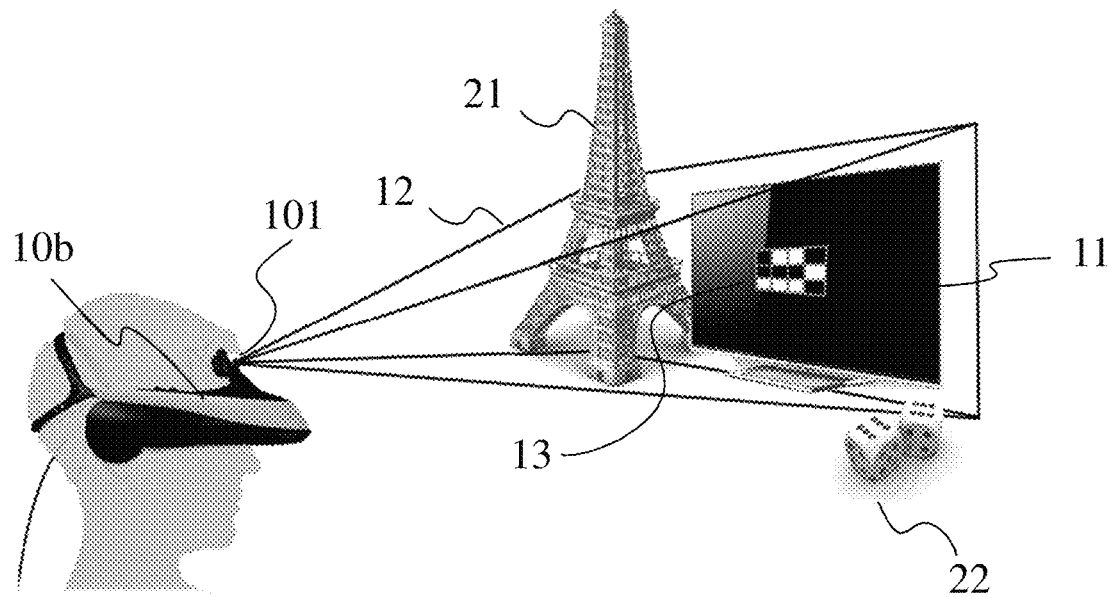
FIG. 2 illustrates an example occulting head mounted display (HMD) device used as a video pass-through device running an AR application as the tablet of FIG. 1, according to a specific embodiment of the present principles.

FIG. 2 illustrates an example occulting head mounted display (HMD) device 10b used as a video pass-through device running an AR application. The HMD 10b constitutes a rig comprising one or two screens in front of the eyes of the user and at least one camera 101 capturing the scene in front of the user. The video captured by the camera 101 is rendered in real time on the screens of the HMD, making the HMD 10a a video pass-through device. A pose estimation system is used by the application to determine the location and the aiming direction of the camera. As the user is watching what the camera 101 is filming, the pose of the camera 101 corresponds to the pose of the user's gaze. On FIG. 2, a marker 13 is displayed on the screen of a real object 11 viewed by the camera. As for the tablet 10a of FIG. 1, any other kind of pose estimation system may be employed. Once the pose of the camera is determined, the AR application adds artificial objects in the three-dimensional scene. An image of the part of these objects included in the frustum 12 of the camera 101 is overlaid on the image of the scene captured by the camera and this composition is rendered on the screens of the video pass-through device 10b. Occultation between objects (real and artificial objects) is managed by the AR application. For example, on FIG. 2, the AR application adds an artificial Eiffel Tower 21 and an artificial pair of dices 22 in a frame of reference defined by the marker and, so, around the real TV set 11. The user sees what is comprised in the frustum 12. So he's watching at the TV set 11, is seeing a part (and only a part) of the Eiffel Tower 21 and is not seeing the pair of dices 22 at all as it is out of the scope of the camera 101.

In the embodiment illustrated on FIG. 2, the user controls the pose of the camera by moving his head. In another embodiment, the camera 101 is motorized and the AR application may partially control the aiming direction of the camera 101. The pose estimation system takes the orientation of the camera 101 in the frame of reference of the HMD into account to estimate the pose.

Figure 3:
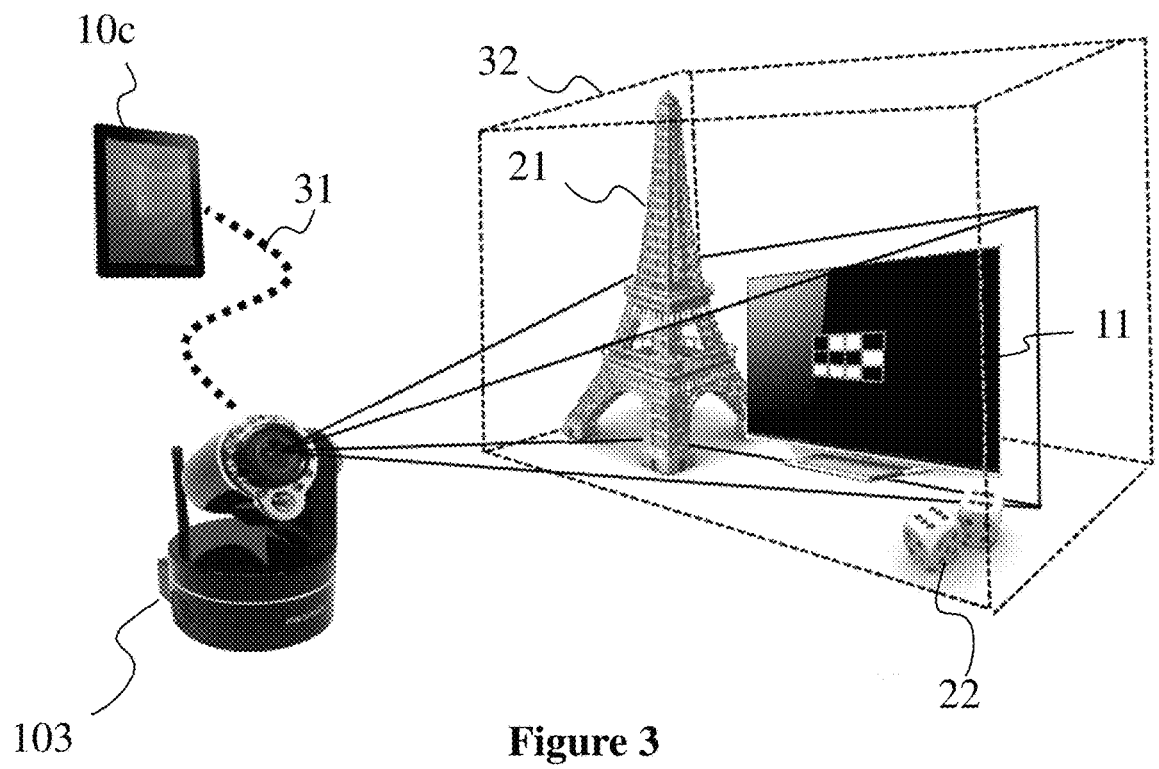
FIG. 3 illustrates an example embodiment of a video pass-through device running an AR application as in FIGS. 1 and 2, in which the camera is motorized and remote from the controlling display device, according to a specific embodiment of the present principles.

FIG. 3 illustrates an example embodiment of a video pass-through device running an AR application. A smartphone 10c controls a motorized camera 103 through a link 31. The link 31 may be a wireline interface (for example a bus interface, a wide area network interface, a local area network interface) or a wireless interface (such as an IEEE 802.11 interface or a Bluetooth® interface). For example, the smartphone is equipped with an inertial measurement unit (IMU) and the AR application tracks the movements of the smartphone and controls the rotation of the camera according to the detected movements. In another embodiment, a user interface is running on the smartphone allowing the user to control the rotation of the camera. The camera captures the scene in front of it (i.e. the part of the real world included in its frustum) containing real objects 11. Images captured by the camera are transferred to the smartphone and rendered in real time on the screen of the smartphone 10c. Such a system constitutes a video pass-through device. The pose of the camera is known at every time according to its motors. In a variant, an external pose estimation system, for example based on fiducial markers, is used in addition, for example if the camera is equipped with motion devices (e.g. wheels or caterpillar tracks).

When running an AR application, the device 10c totally or partially overlays artificial objects 21 on the images captured by the camera 103. Some artificial objects of the AR scene may be out of the scope of the camera, like, for instance, the pair of dices 22 in the example of FIG. 3. According to a particular embodiment of the present invention, boundaries 32 of the augmented reality scene are calculated. The AR scene encompasses every artificial object 21 and 22 which constitute the AR content of the AR application. That is what the user has to see. In a variant the scene also contain invisible artificial objects. An invisible object is an element of the AR scene that is not rendered (i.e. no artificial image is overlaid on the image captured by the camera for this element). Such an invisible object may, for instance, wrap the shape of a real object as the TV set 11 of FIGS. 1, 2 and 3. So, a real object may be included within the boundaries of the scene without modifying the image captured by the camera. An invisible object corresponds to a volume of the real world the creator of the AR application wants to include in the boundaries of the AR scene. The boundaries embrace the elements of the AR content as closely as possible. The boundaries 32 are determined in a way to encompass every elements of the AR content, which may be artificial and real objects, preferably in a manner that embrace these elements as closely as possible. On FIG. 3, the boundaries of the AR scene are the three-dimension bounding box of the set of the elements of the AR content. In variants, the boundaries may be a bounding ellipse or the convex hull of the AR scene. In a particular embodiment, the elements of the AR scene may be moving or changing of shape over the time. In a variant, the number of elements of the scene may vary over the time. In such an embodiment, the boundaries are calculated every time a change in the scene is detected. In a variant, the boundaries are calculated on a regular frequency, for example each tenth of a second or each half of a second.

Figure 4:
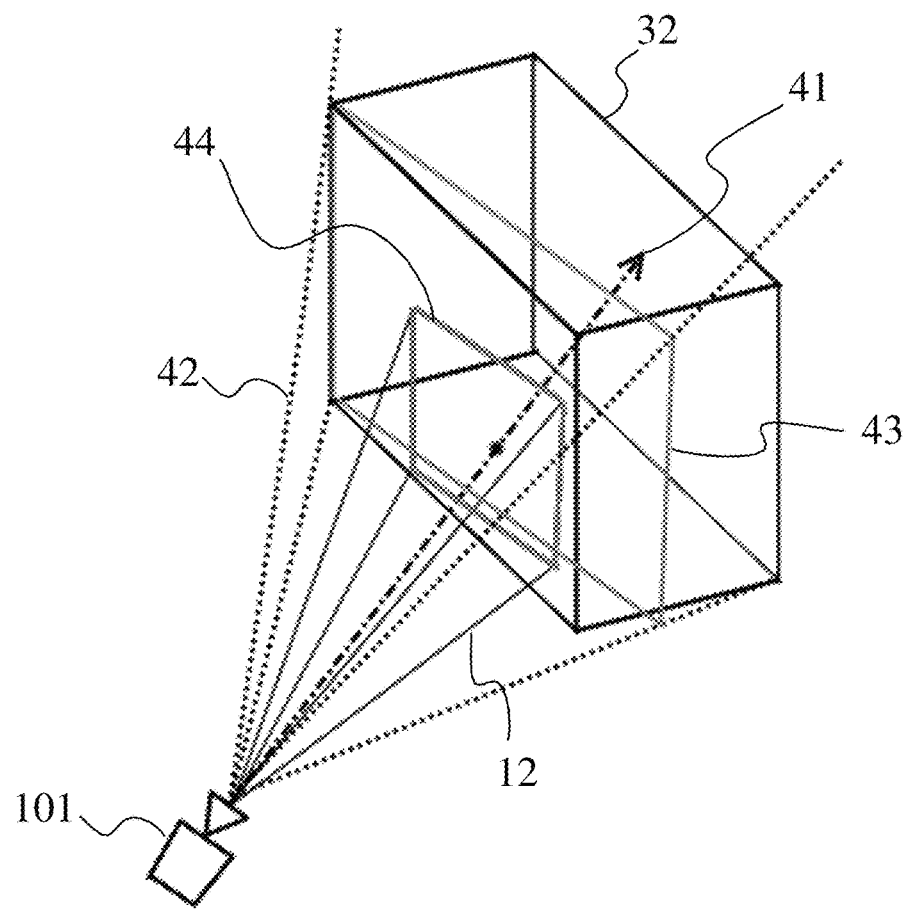
FIG. 4 illustrates calculations based on the camera's frustum of FIGS. 1, 2 and 3 and the boundaries of the augmented reality scene of FIGS. 2 and 3, according to a specific embodiment of the present principles.

FIG. 4 illustrates calculations based on the camera's frustum and the boundaries. Based on the calculation of the boundaries and according to the location and the aiming direction of the camera in the virtual world, determined according to the pose estimation of the camera 101, two noticeable rectangles are calculated in the virtual frame of reference. It is understood that the camera is located within the virtual world of the AR application according to the pose estimation. A camera is reducible, in a virtual scene, to a point corresponding to the focal point of the real camera. When estimating the pose of the camera 101, the system estimates, first, the location of the focal point of the camera in the frame of reference of the virtual scene, and second, the aiming direction 41 (i.e. orientation) of the camera in the same frame of reference. Frustum 12 referenced in FIGS. 1, 2 and 4 are based on the pose estimation. A pyramid 42 is determined, the pyramid pointing on the focal point of the camera and encompassing the entire boundaries 32. On the example of FIG. 4, the boundaries 32 are shaped as a bounding box and the pyramid 42 is a four-sided pyramid. In variants of boundaries, the pyramid 42 may be a cone or a pointed volume of any shape. Based on the boundaries 32 and the pyramid 42, a rectangle 43 called the near face rectangle 43 of the boundaries is calculated. The near face 43 is the rectangle defined by the conjunction of the five following conditions:

Rectangle 43 is perpendicular to the aiming direction 41;
Rectangle 43 is a bounding rectangle of the pyramid 42;
Rectangle 43 is encompassing the totality of the boundaries;
Edges of rectangle 43 are parallel to the edges of the frustum rectangle 44;
Rectangle 43 is the nearest from the camera 101 of the rectangles obeying previous conditions.

The frustum rectangle 44 is the rectangle defined by the camera frustum 12 which is in the plane of the near face rectangle 43.

Figure 5A:
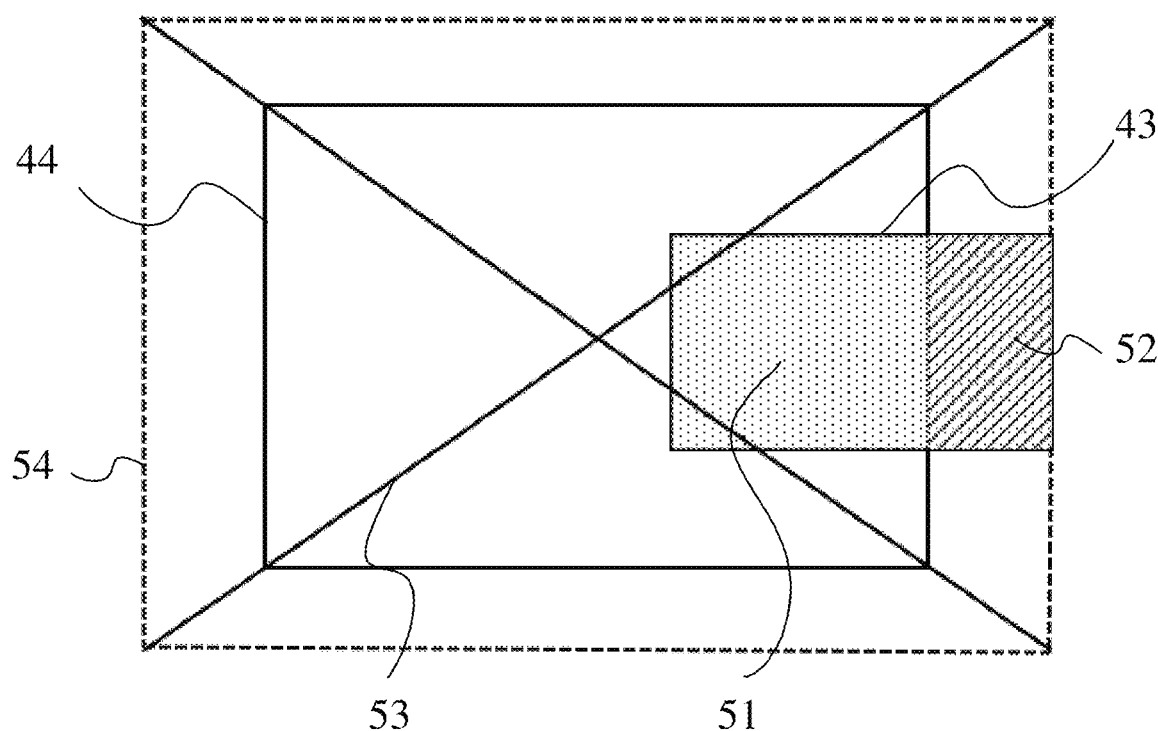
FIG. 5a illustrates an example calculation of a zoom out coefficient according to the boundaries of FIG. 4, according to a specific embodiment of the present principles.

FIG. 5a illustrates an example calculation of a zoom out coefficient. For a given pose of the camera 101, the AR scene is rendered with maximal size if, the near face rectangle 43 is included in the frustum rectangle 44 and if at least one edge of the near face rectangle 43 is overlaid on one edge of the frustum rectangle 44. On the example of FIG. 5a, a part 51 of the rectangle 43 is inside the frustum rectangle 44 and the remaining part 52 is outside. In order to maximize the rendering of the AR scene without moving the camera 101 (i.e. without moving the centre of the frustum rectangle 44), the frustum rectangle is enlarged along its diagonals up to make one of its edges overlay the external edge of the near face rectangle 43 to obtain a new frustum rectangle 54. This operation corresponds to a zoom out for the camera 101. The zoom coefficient is determined, for instance, by dividing the length of the diagonal of the new frustum rectangle 54 by the length of the diagonal of the actual frustum rectangle 44. In this example, the zoom coefficient is greater than one, so it corresponds to a zoom out.

Figure 5B:
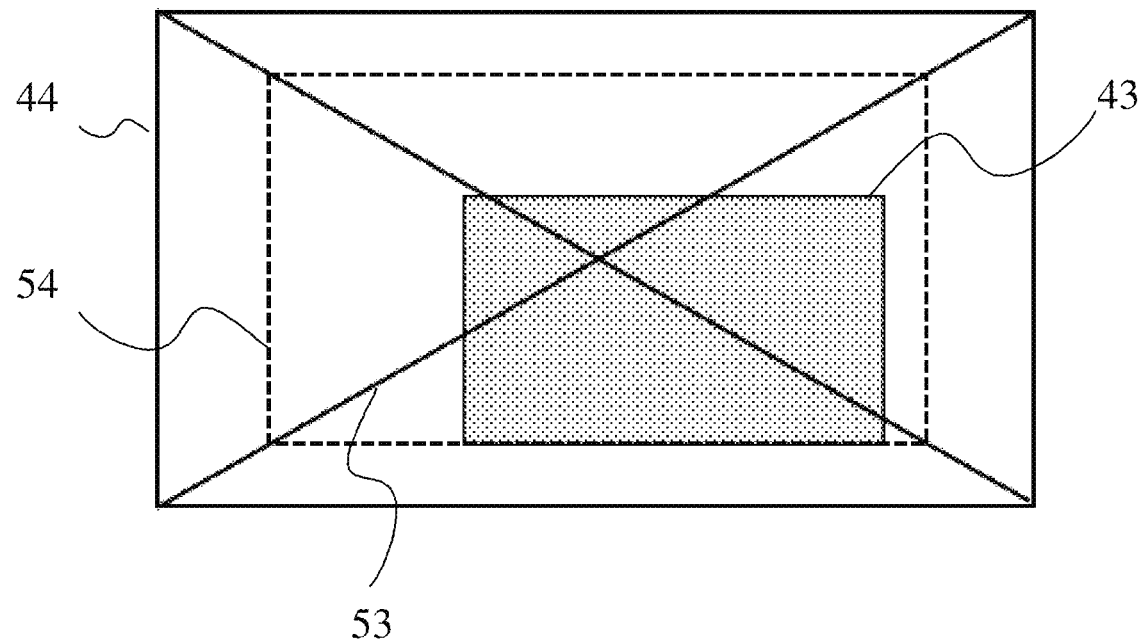
FIG. 5b illustrates an example calculation of a zoom in coefficient according to the boundaries of FIG. 4, according to a specific embodiment of the present principles.

FIG. 5b illustrates an example calculation of a zoom in coefficient. When the near face rectangle 43 is fully included in the frustum rectangle 44, the rendering of the AR scene is not optimal as it may be rendered in an enlarged way. The frustum rectangle 44 is reduced along its diagonals 53 up to make at least one of its edges overlay at least one of the edges of the near face rectangle 43. In this example, the zoom coefficient is lower than one so it corresponds to a zoom in. The zoom coefficient is determined according to the near face rectangle 43 and the frustrum rectangle 44.

Figure 6:
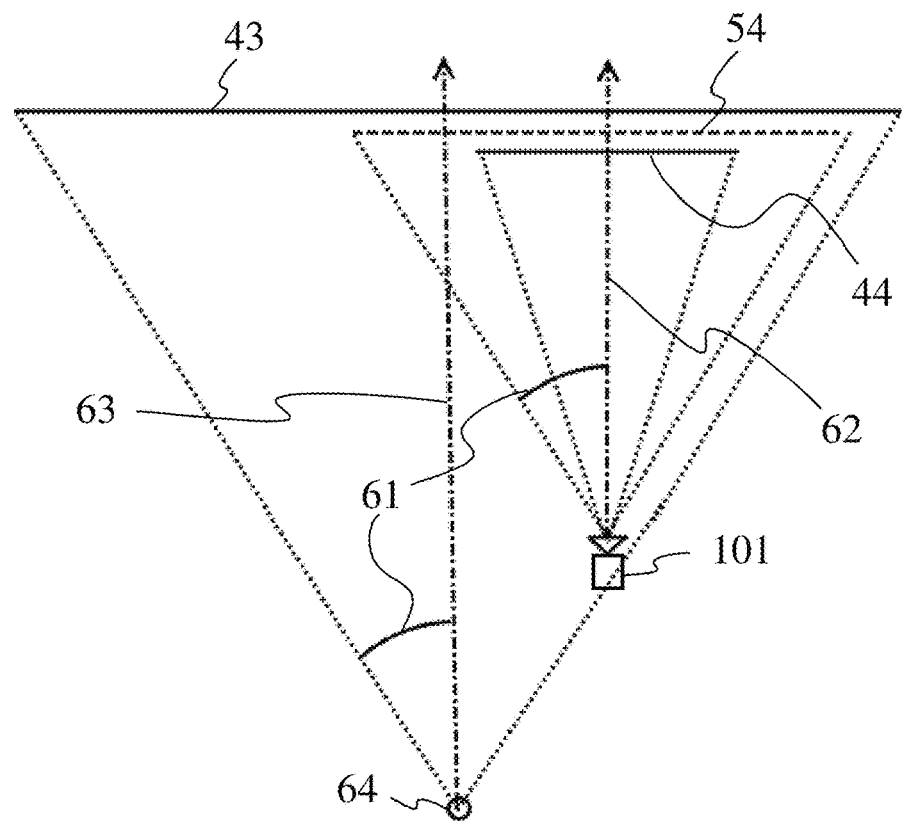
FIG. 6 illustrates an example calculation of an optimal position 64 for the camera of FIGS. 1, 2 and 3, according to a specific embodiment of the present principles.

FIG. 6 illustrates an example calculation of an optimal position 64 for the camera 101. Camera 101 is equipped with an optical zoom apparatus which modifies the focal of its lens system according to control instructions from the AR application. The focal of a camera is directly linked to its field of view. Due to physical constraints, the camera 101 has a maximal field of view over which it cannot operate. Reciprocally, a minimal field of view may be determined under which filming conditions are no longer satisfying. When the AR application applies the zoom coefficient calculated according to the near face rectangle 43 and the frustrum rectangle 44 to the camera 101, it modifies the field of view of the camera 101 up to one of its maxima. When the minimal field of view is reached, it means that the camera 101 is too far from the near face rectangle to capture the scene in a dimension satisfying for the user. Reciprocally, when the maximal field of view is reached, the camera 101 is too close from the near face rectangle and cannot capture it in its entirety as illustrated on FIG. 6. On FIG. 6, seen from above, rectangles 43, 44 and 54 have been shifted for the sake of clarity. It is understood that these three rectangles belong to a same plane. In this example, the angle 61 corresponds to the maximal opening of the field of view of the camera 101. Considering the width of the near face rectangle 43, according to a particular embodiment of the present principles, the AR application commands the maximum zoom out to the camera 101. However, the camera 101 is too close from the near face rectangle to capture the entire virtual scene. The AR application does not displace the camera 101. However, the AR application may indicate to the user where is the optimal position for having an optimal rendering of the virtual scene. For instance, the AR application may display arrows on the screen of the device 10a, 10b or 10c to indicate to the user in which way to move. In a variant, the system is using audio messages or haptic effects (e.g. vibrations) to indicate the optimal position to the user. First, for an optimal rendering, the aiming direction of the camera 101 has to cross the centre of the near face rectangle 43. On the example of the FIG. 6, the user has to move to his left. Second, the maximum angle 61, called α, is the one that allows a minimal displacement backward. The distance 63, called $z_2$, between the near face rectangle 43 and the optimal position 64, is computed according to the distance 62, called $z_1$, between the camera 101 and the plane of the three rectangles, the width, called $w_1$, of the new frustum rectangle 54 and the width, called $w_2$, of the near face 43 according to the following equation [E1]:

$$\tan(\alpha) = \frac{w_1}{2z_1} = \frac{w_2}{2z_2} => z_2 = \frac{z_1 w_2}{w_1}$$

In the example of FIG. 7, the user is incited to move backward of a distance of $z_2-z_1$. The same principles are used for the minimal field of view of the camera 101.

In another embodiment, the camera 101 is not equipped with an optical zoom apparatus. In such an embodiment, the AR application uses a digital zoom function to control the field of view of the rendered image. The maximal field of view corresponds to the field of view of the camera 101. As a digital zoom in decreases the image's quality, the minimal field of view is determined in order to maintain a minimal quality. Same principles are applied in the embodiment. In a variant, the AR content comes with an estimation of the maximal size of the boundaries during the experience. The user may be asked to move toward an optimal position only once, for instance, at the beginning of the experience. In a variant, at least one of the elements of the virtual scene are associated with a main direction. For instance, in the example of FIGS. 1, 2 and 3, the television set 11, even if it constitutes a non-rendered element of the virtual scene, may be associated with a main direction (e.g. the normal to its screen). The optimal position is computed according to these main directions, so the user is incited to move in front of the main elements. Elements of the virtual scene with a main direction may be associated with a weight (e.g. an integer between 0 and 100 or a real number between 0 and 1) in order to compute the optimal position of the camera 101. An optimization algorithm is used to find an optimal trade-off between weighted main directions.

In some embodiments, the camera 101 is motorized and is able to rotate. An optimal orientation is computed according to the minimal and maximal field of view of the camera 101. The optimal orientation may be computed according to the near face rectangle 43 as calculated for the actual aiming direction of the camera. In a variant, as the near face rectangle depends on the aiming direction of the camera, a near face rectangle is calculated for possible orientations. An optimization algorithm is used to compute the optimal orientation.

FIG. 7 shows a hardware embodiment of an apparatus 70 configured to render images from a camera 101 on a display device 79 when playing an augmented reality scene. FIG. 7 is an example hardware embodiment of systems as described with FIGS. 1 to 3. In this example, the device 70 comprises the following elements, connected to each other by a bus 73 of addresses and data that also transports a clock signal:

a microprocessor 71 (or CPU),
a graphics card 76,
a non-volatile memory of ROM (Read Only Memory) type 74,
a Random Access Memory or RAM (75), the graphics card 76 may embed registers of random access memory,
an optional internal pose estimation system 720, for example in the form of an inertial measurement unit comprising gyroscopes, accelerometers and/or compasses,
a optional set of I/O (Input/Output) devices 721 such as for example a mouse, a joystick, a webcam, etc., and
a power source 77.

The device 70 may be connected to an external pose estimation system 722 which transmit data to the CPU 71 via the bus of addresses 73.

The device 70 is connected to a camera 101. In some embodiments, the camera 101 is motorized. In particular embodiments, the camera 101 is equipped with an optical zoom apparatus which modifies the focal of its lens system according to control instructions received via the bus 73.

Advantageously, the device 70 is connected to one or more display devices 79 of display screen type directly to the graphics card 76 to display images calculated in the graphics card. In a variant, the one or more display device 79 is connected to the graphic card 76 via the bus 73. In a particular embodiment, the pose estimation system 722 and/or the one or more display device 79 are integrated to the device 70 such as for Head Mounted Devices, tablets or smartphones as described with FIGS. 1 to 3.

It is noted that the word "register" used in the description of memories 74, 75 and 76 designates in each of the memories mentioned, both a memory zone of low capacity (some binary data) as well as a memory zone of large capacity (enabling a whole program to be stored or all or part of the data representative of data calculated or to be displayed).

When switched-on, the microprocessor 71, according to the program in a register of the ROM 74, loads and executes the instructions of the program in registers of the RAM 75.

According to one particular embodiment, the algorithms implementing the steps of the method specific to the present disclosure and described hereafter are advantageously stored in a memory GRAM of the graphics card 76 associated with the device 70 implementing these steps.

According to a variant, the power supply 77 is external to the device 70.

FIG. 8 diagrammatically shows an embodiment of a method 80 as implemented in a processing device such as the device 70 according to a non-restrictive advantageous embodiment.

In an initialization step 801, the device obtains data needed for playing the AR application. The associated programs and the AR scene are loaded in the RAM 75 and, in a variant, at least for a part, in the GRAM of the graphic board 76. Initial pose of the camera 101 is estimated.

In a step 802, the pose of the camera 101 within the frame of reference of the AR scene is estimated. In a variant, this step is executed in parallel with other steps and iterated regularly, for instance at twenty hertz or at seventy hertz. The pose estimation is computed according to information from at least one source. For example, the camera 101 is integrated in the device 70 which is equipped with an IMU. The AR application tracks the differential pose of the device, and so, of the camera. In a variant, the system is equipped with a set of infra-red cameras which film infra-red plots on the camera 101. An image processing is required, for instance by the CPU 71 of the device 70, to estimate the pose of the camera according to intrinsic and extrinsic parameters of infra-red cameras. In another variant, the camera 101 is filming at least one fiducial marker (as in the example of FIG. 1) and the AR application estimates the pose of the camera 101, by executing an image processing for instance on the CPU 71 of the device 70, according to the known pose of the recognized fiducial markers.

In a step 803, the boundaries of the AR scene are calculated as described in FIG. 3. A near face rectangle 43 and a frustum rectangle 44 are computed according to the estimated pose of the camera 101 (i.e. its location and its aiming direction), its field of view and the boundaries as described in FIG. 4. The double bar 820 on FIG. 8 indicates that the following step of the method 80 depends on the embodiment of the system. The method may consist, in a step 804, of testing if the actual position of the camera 101 is optimal (or not too far from the optimal position). It is understood that the wording "position", as well as "pose", refers to the location and the aiming direction of the camera. For example, the test may consist in estimating whether the near face rectangle could be included in the field of view of the camera when the zoom factor is minimal (i.e. the field of view of the camera is maximal). If not, the actual position is not optimal because whatever the zoom factor, the camera is too close from the AR scene to encompass it at all in its frustum. Same principles are applicable when the camera is too far from the scene (i.e. the near face rectangle occupies a small part of the minimal frustum rectangle). In a variant, the test may consist in calculating whether the camera 101 is actually in front of elements of the scene associated with main directions. Weights associated to these directions are taken into account to compute this test. If the camera 101 is not in an optimal position, the step 805 is executed. If the camera 101 passes the test 804 of optimal position, the step 807 is executed. In another embodiment, the step 805 is executed regularly, in parallel with the step 807. In another embodiment, the step 805 is systematically executed after the step 803. In such an embodiment, the test 804 is never performed.

In a step 805, an optimal position is calculated for the camera 101. The computed optimal position is a point of view from which the viewing of the AR scene is optimized. This calculus takes the boundaries and the camera's parameters into account as described in FIG. 6. In a variant, this calculus also takes weighted main directions associated with at least one element of the AR scene to determine the optimal position. In a step 806, the computed optimal position is indicated to the user through visual effects, for example by overlaying arrows on the images rendered by the AR application. In a variant, the optimal position is indicated to the user through haptic effects, for example by activating vibrator for example embedded in the device 70 or wore by the user as a haptic bracelet or a haptic vest. In another variant, the optimal position is indicated thanks to audio messages, for instance, stereo beeps or speech utterances.

In a step 807, a zoom coefficient is computed according to the near face rectangle 43, the pose of the camera 101 and the parameters of the camera 101 comprising its maximal and minimal field of view as described on FIGS. 5a and 5b. The double line 821 on FIG. 8 indicates that the following step depends on the embodiment of the system. If the camera 101 is equipped with an optical zoom apparatus, a step 808 may be executed. The zoom coefficient calculated at step 807 is used by the CPU 71 of the device 70 to transmit instructions to the optical zoom apparatus of the camera 101. If the camera 101 is not equipped with an optical zoom apparatus, a step 809 is executed instead of step 808. In this step, a digital zoom is operated according to the computed zoom coefficient. A crop is performed on the images captured by the camera 101 up to a size which correspond to the minimal field of view under which the quality of the images is no longer estimated sufficient. If the zoom coefficient corresponds to the maximal field of view, no crop is performed. In a variant, the step 809 may be performed before, after or in parallel with the step 808. If the camera 101 is motorized, a step 810 is executed. The AR application computes an optimal aiming direction for the camera 101 in order to optimize the view conditions of the AR scene and transmits instruction to the camera 101 to make it rotate. In a variant, the step 810 is performed before, after or in parallel with step 808 and/or 809 according to the embodiment of the system.

When the zoom and the aiming direction of the camera 101 have been adjusted, a step 811 is executed. This step consists in the classical processing of the AR application, i.e. overlaying the part of the AR scene viewed from the adjusted point of view of the camera 101 on the images captured by the camera 101. The method 80 is iteratively executed from step 802 to take changes of the camera pose and/or changes of the AR scene into account and update rendered images.

Naturally, the present disclosure is not limited to the embodiments previously described.

In particular, the present disclosure is not limited to a method of rendering images from a camera on a display device when playing an augmented reality scene but also extends to any method of transmitting instructions to motors controlling the camera or to any method of transmitting visual, audio or haptic effects for indicating an optimal position to the user. The implementation of calculations necessary to generate the boundaries and the rectangles used for the computation of the zoom coefficient is not limited either to an implementation in shader type microprograms but also extends to an implementation in any program type, for example programs that can be executed by a CPU type microprocessor.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, Smartphones, tablets, computers, mobile phones, portable/personal digital assistants ("PDAs"), and other devices that facilitate communication of information between end-users.

Implementations of the various processes and features described herein may be embodied in a variety of different equipment or applications, particularly, for example, equipment or applications associated with data encoding, data decoding, view generation, texture processing, and other processing of images and related texture information and/or depth information. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method of rendering images on a display device when playing an augmented reality scene from the point of view of a camera in a real scene, the method comprising:
   determining 3D boundaries of the augmented reality scene, said boundaries embracing every 3D element of the augmented reality scene, the augmented reality scene being a 3D model comprising 3D models of objects and non-rendered 3D elements corresponding to objects of the real scene;
   determining a zoom coefficient according to an estimation of a pose of the camera and the 3D boundaries of the scene; and
   rendering images on the display device from the camera according to the zoom coefficient.

2. The method of claim 1, comprising indicating a position of the camera to the user using effects from group comprising visual, audio or haptics effects.

3. The method of claim 2, wherein said position is determined according to a direction and a weight associated with at least one element of the augmented reality scene.

4. The method of one of claim 1, comprising controlling the aiming direction of said camera according to the boundaries of the augmented reality scene and said zoom coefficient.

5. The method of one of claim 1, wherein said camera comprises an optical zoom function, the method further comprising controlling said optical zoom function according to said zoom coefficient.

6. The method of one of claim 1, comprising operating a digital zoom on said images according to said zoom coefficient.

7. A device having a display configured to render images when playing an augmented reality scene from a point of view of a camera in a real scene, the device comprising a memory associated with at least one processor configured to:
   determine 3D boundaries of the augmented reality scene, said boundaries embracing every 3D element of the augmented reality scene, the augmented reality scene being a 3D model comprising 3D models of objects and non-rendered 3D elements corresponding to objects of the real scene;
   determine a zoom coefficient according to an estimation of a pose of the camera and the 3D boundaries of the scene;
   render images from the camera according to the zoom coefficient.

8. The device of claim 7, further comprising a transmitter configured to transmit an indication of a position of the camera to the user using effects from group comprising visual, audio or haptics effects.

9. The device of claim 8, wherein said position is determined according to a direction and a weight associated with at least one element of the augmented reality scene.

10. The device of one of claim 7, wherein said processor is further configured to control the aiming direction of said camera according to the boundaries of the augmented reality scene and said zoom coefficient.

11. The device of one of claim 7, wherein said camera comprises an optical zoom function, said processor being further configured to control said optical zoom function according to said zoom coefficient.

12. The device of one of claim 7, wherein said processor is further configured to operate a digital zoom on said images according to said zoom coefficient.

13. A non-transitory medium readable by computer and/or executable by a processor having stored instructions for causing said computer or said processor to perform at least the steps of the method according to one of the claim 1.

* * * * *